(12) United States Patent
Jin

(10) Patent No.: US 11,341,963 B2
(45) Date of Patent: *May 24, 2022

(54) ELECTRONIC APPARATUS AND METHOD FOR CONTROLLING SAME

(71) Applicant: SAMSUNG ELECTRONICS CO., LTD., Suwon-si (KR)

(72) Inventor: Jangho Jin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 123 days.

This patent is subject to a terminal disclaimer.

(21) Appl. No.: 16/211,799

(22) Filed: Dec. 6, 2018

(65) Prior Publication Data

US 2019/0172461 A1  Jun. 6, 2019

(30) Foreign Application Priority Data

Dec. 6, 2017 (KR) .................. 10-2017-0166409

(51) Int. Cl.
*G10L 15/22* (2006.01)
*G10L 15/30* (2013.01)
*G10L 15/32* (2013.01)

(52) U.S. Cl.
CPC .............. *G10L 15/22* (2013.01); *G10L 15/30* (2013.01); *G10L 15/32* (2013.01); *G10L 2015/223* (2013.01)

(58) Field of Classification Search
CPC ..... H04N 21/42222; H04N 2005/4432; H04N 21/4126; H04N 21/42204; G06F 3/167
See application file for complete search history.

(56) References Cited

U.S. PATENT DOCUMENTS

| | | |
|---|---|---|
| 5,479,490 A | 12/1995 | Nakashima |
| 6,567,775 B1 | 5/2003 | Maali et al. |
| 9,318,111 B2 | 4/2016 | Lee et al. |
| 9,349,370 B2 | 5/2016 | Fujisawa et al. |
| 9,443,519 B1 | 9/2016 | Bakshi et al. |
| 2009/0248413 A1 | 10/2009 | Liu et al. |
| 2012/0042343 A1* | 2/2012 | Laligand .......... H04N 21/41407 725/53 |

(Continued)

FOREIGN PATENT DOCUMENTS

| | | |
|---|---|---|
| JP | 2002-041083 | 2/2002 |
| JP | 5244663 | 7/2013 |

(Continued)

OTHER PUBLICATIONS

Non-Final Office Action dated Feb. 5, 2018 in U.S. Appl. No. 15/490,994.

(Continued)

*Primary Examiner* — Thomas H Maung
(74) *Attorney, Agent, or Firm* — Nixon & Vanderhye P.C.

(57) ABSTRACT

An electronic apparatus is provided. The electronic apparatus includes a memory configured to store a voice recognition application, and a processor configured to execute the voice recognition application based on receiving a voice input initiation signal. The processor is configured to control a communication interface comprising communication circuitry to establish a session with a voice recognition server before the voice recognition application is executed.

16 Claims, 13 Drawing Sheets

(56) References Cited

U.S. PATENT DOCUMENTS

| | | | |
|---|---|---|---|
| 2013/0035942 A1* | 2/2013 | Kim | G06F 3/167 |
| | | | 704/275 |
| 2014/0012587 A1 | 1/2014 | Park | |
| 2014/0122075 A1* | 5/2014 | Bak | G10L 15/32 |
| | | | 704/246 |
| 2014/0244429 A1* | 8/2014 | Clayton | G06Q 30/0631 |
| | | | 705/26.7 |
| 2014/0316776 A1 | 10/2014 | Lee et al. | |
| 2015/0106099 A1 | 4/2015 | Choi et al. | |
| 2016/0112792 A1 | 4/2016 | Lee et al. | |
| 2016/0119710 A1 | 4/2016 | Mallinson et al. | |
| 2016/0127816 A1 | 5/2016 | Mickelsen et al. | |
| 2016/0171976 A1 | 6/2016 | Sun et al. | |
| 2017/0154625 A1* | 6/2017 | Heo | G10L 15/32 |
| 2017/0345421 A1 | 11/2017 | Jin | |
| 2018/0144740 A1 | 5/2018 | Laroche et al. | |

FOREIGN PATENT DOCUMENTS

| | | |
|---|---|---|
| JP | 6024675 | 11/2016 |
| KR | 10-0641148 | 10/2006 |
| KR | 10-2009-0025939 | 3/2009 |
| KR | 10-1208166 | 12/2012 |
| KR | 10-2013-0070947 | 6/2013 |
| KR | 10-2013-0134545 | 12/2013 |
| KR | 10-2014-0054643 A | 5/2014 |
| KR | 10-2015-0043807 | 4/2015 |
| KR | 10-2016-0045463 | 4/2016 |
| WO | WO 2014/069798 A1 | 5/2014 |

OTHER PUBLICATIONS

Final Office Action dated Jul. 5, 2018 in U.S. Appl. No. 15/490,994.
Hyundai Hcn, "Smart Remote control—Hyundai Hcn Smart—We Inform You How to Use a Service and Installlation Methods", published on Oct. 18, 2014 http://web.archive.org/web/20141018051650/http://www.hcn.co.kr/ur/bs/tv/tvService.hcn?method=man_02&p_menu_id=090306.
Extended European Search Report dated Apr. 3, 2019 issued in European Patent Application No. 18210537.9.
European Office Action dated Mar. 4, 2021 for EP Application No. 18210537.9.
Korean Office Action dated Jan. 17, 2022 for KR Application No. 10-2017-0166409.

\* cited by examiner

ELECTRONIC APPARATUS AND METHOD FOR CONTROLLING SAME

CROSS-REFERENCE TO RELATED APPLICATION

This application is based on and claims priority under 35 U.S.C. § 119 to Korean Patent Application number 10-2017-0166409, filed on Dec. 6, 2017, in the Korean Intellectual Property Office, and the disclosure of which is incorporated by reference herein in its entirety.

BACKGROUND

1. Field

The disclosure relates generally to an electronic apparatus and a method for controlling same. For example, the disclosure relates to an electronic apparatus establishing a session with a voice recognition server, and a method for controlling the electronic apparatus.

2. Description of Related Art

An electronic apparatus receiving an audio data and transmitting the received audio data to a voice recognition server processes entering via a microphone via hardware of various steps and software designed to have a hierarchy structure.

Modern electronic apparatuses such as a TV, a smartphone and the like, are designed to process various functions, and thus have complex hardware and software configurations.

To process multiple signal inputs from various hardware, such as a radio frequency (RF) signal, a Bluetooth signal, a Wi-Fi signal, and the like, a software hierarchy includes complex steps including a kernel, a device driver, a middleware, an application, etc.

To receive input of an external audio by means of an audio input apparatus such as a remote controller, the user presses a button of a remote controller, and then initiates an audio input. In this case, when the button of the remote controller is pressed (based on the button of the remote controller being pressed), an audio input initiation request is transmitted to a main apparatus through a wireless signal such as BT, Wi-Fi and the like, and the main apparatus transfers the request to an application through a software hierarchy of various steps. In addition, the application initiates an internal processing (e.g., initiation of driving), and simultaneously commands a hardware apparatus to transfer an audio data. The audio data may not be collected and transferred to an external voice recognition server until after the software hierarchy is gone back down, the command is transferred to the remote controller, and the remote controller receives the command.

That is, according to the related art, it is necessary to go through a bottom layer of the software hierarchy all the way to a top layer to transfer and process a control signal entering from hardware, and thus a time it takes to establish a session with a voice recognition server according to a processing time by layer is displayed. Accordingly, there is a problem that the entire voice recognition process is delayed.

The above information is presented as background information only to assist with an understanding of the disclosure. No determination has been made, and no assertion is made, as to whether any of the above might be applicable as prior art with regard to the disclosure.

SUMMARY

Example aspects of the disclosure address at least the above-mentioned problems and/or disadvantages and to provide at least the advantages described below. Accordingly, an example aspect of the disclosure provides an electronic apparatus establishing a session with a voice recognition server before a voice recognition application is driven, and a method for controlling the electronic apparatus.

In accordance with an example aspect of the disclosure, an electronic apparatus is provided. The electronic apparatus includes a memory configured to store a voice recognition application, and a processor configured to execute (drive) the voice recognition application based on receiving a voice input initiation signal. The processor may be configured to control a communication interface to establish a session with a voice recognition server before the voice recognition application is executed.

The voice input initiation signal may be received from an external apparatus, may be generated by clicking a button of the electronic apparatus generating the voice input initiation signal. Accordingly, in the following disclosure, an operation of the user receiving the voice input initiation signal from an external apparatus may be replaced with an operation of clicking the button of the electronic apparatus.

In addition, an audio data may be received from an external apparatus including a microphone. An audio data may be received via a microphone included in the electronic apparatus. Accordingly, in the following disclosure, an operation of receiving an audio data from an external apparatus may be replaced with an operation of receiving an audio data via a microphone included in the electronic apparatus, and the reverse may be the same.

The electronic apparatus may further include a communication interface comprising communication circuitry configured to communicate with an external apparatus including a microphone. The memory may be configured to store software including a middleware configured to relay the voice recognition application. The processor may be configured to generate an event to execute the voice recognition application by the middleware based on receiving the voice input initiation signal, to control the communication interface to send a signal for activating the microphone to the external apparatus, and to control the communication interface to establish a session with the voice recognition server.

The processor may be configured to control the communication interface to send the received audio data to the voice recognition server based on receiving audio data corresponding to a user utterance.

The processor may be configured to identify (determine) whether a session with the voice recognition server is established based on receiving the voice input initiation signal, to reset the established session based on a session being established, and to control the communication interface to establish a new session based on the session not being established.

The processor may be configured to further include a buffer. The processor may be configured to store the received audio data in the buffer between a time when a signal for activating the microphone is sent (based on a signal for activating the microphone being sent) and a time when driving of the voice recognition application is completed based on an audio data being received from the external apparatus, and to control the communication interface to send the audio data stored in the buffer to the voice recognition server.

The processor may be configured to control the communication interface to establish a session with the voice recognition server based on receiving an audio data.

The electronic apparatus may further include a display. The processor may be configured to control the display to display information relating to a voice recognition progress based on receiving a voice input initiation signal.

The processor may be configured to identify (determine) whether an audio data is currently sent based on the application executing (running, driving), and to wait until sending of the audio data is completed based on the audio data being sent.

The communication interface may be configured to include a first communication interface comprising communication circuitry configured to perform communication in a first communication method, and a second communication interface comprising communication circuitry configured to perform communication in a second communication method different from the first communication method. The processor may be configured to establish a session with the voice recognition server via the second communication interface based on receiving a voice input initiation signal from the external apparatus via the first communication interface.

The communication interface may be configured to receive, from the external apparatus, a voice input initiation signal based on a button press of the external apparatus and information relating to a time for which the button is pressed. The processor may be configured to control the communication interface to block the established session based on the received information relating to the time for which the button is pressed, and based on the time for which the button is pressed being greater than a predetermined time.

In accordance with another example aspect of the disclosure, a method of controlling an electronic apparatus configured to store a voice recognition application is provided. The method includes establishing a session with a voice recognition server based on receiving a voice input initiation signal, and after establishing the session, executing the voice recognition application.

The method may further include sending a signal for activating a microphone to an external apparatus by a middleware relaying a voice recognition application stored in a software. The executing the voice recognition application may include generating an event to execute the voice recognition application by the middleware.

The method may further include, sending the received audio data to the voice recognition server via the established session based on receiving an audio data corresponding to a user utterance.

The establishing the session with the voice recognition server may include, identifying (determining) whether a session with the voice recognition server is established based on receiving the voice input initiation signal, resetting the established session based on a session being established, and establishing a new session based on the session not being established.

The method may further include, storing received audio data in a buffer between a time when a signal for activating the microphone is sent and a time when driving of the voice recognition application is completed, based on audio data being received from the external apparatus, and sending the audio data stored in the buffer to the voice recognition server.

The establishing the session with the voice recognition server may include, establishing a session with the voice recognition server based on receiving audio data.

The method may further include, displaying information relating to a voice recognition progress based on receiving a voice input initiation signal.

The processor may be configured to identify (determine) whether the audio data is currently sent based on the application being driven, and to wait until sending of the audio data is completed based on the audio data being sent.

The receiving the voice input initiation signal from the external apparatus may include receiving the voice input initiation signal via a first communication method. The sending the received audio data to the voice recognition server may include sending the received audio data via a second communication method different from a first communication method.

In the receiving the voice input initiation signal from the external apparatus, the voice input initiation signal may generated by engaging a button of the external apparatus. The method may further include receiving, from the external apparatus, information relating to a time for which the button is pressed, and blocking the established session based on the received information relating to the time for which the button is pressed being greater than a predetermined time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following detailed description, taken in conjunction with the accompanying drawings, in which.

The same reference numerals are used to represent the same elements throughout the drawings.

DETAILED DESCRIPTION

Figure 1:
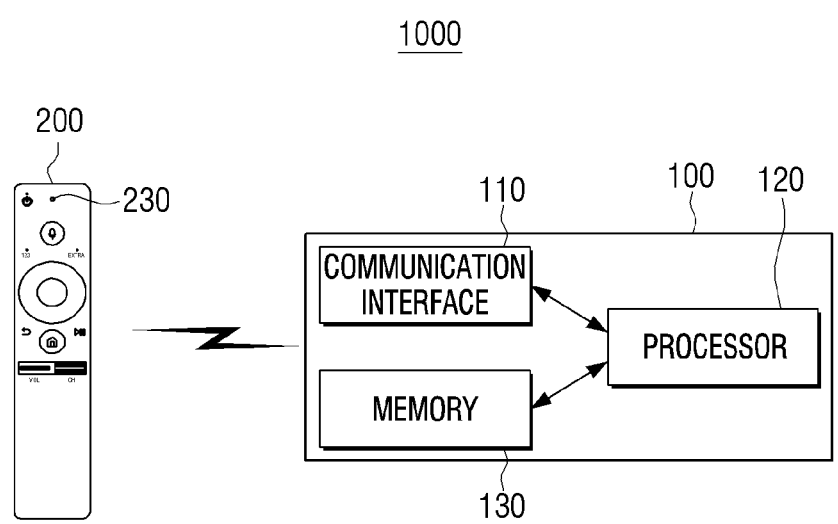
FIG. 1 is a diagram illustrating an example system including an electronic apparatus and an external apparatus, according to an example embodiment.

Before describing the various example embodiments of the present disclosure, a background for understanding the present disclosure and drawings will be provided.

The terms used in the present disclosure and the claims are general terms selected in consideration of the functions of the various embodiments of the present disclosure. However, these terms may vary depending on intention, legal or technical interpretation, emergence of new technologies, and the like of those skilled in the related art. Also, there may be some terms that are arbitrarily selected. Unless there is a specific definition of a term, the term may be understood based on the overall contents and technological common sense of those skilled in the related art.

Also, the same reference numerals or symbols described in the attached drawings denote parts or elements that actually perform the same functions. For convenience of descriptions and understanding, the same reference numerals or symbols are used and described in different example embodiments. In other words, although elements having the same reference numerals are all illustrated in a plurality of drawings, the plurality of drawings do not necessarily refer one example embodiment.

Further, the terms including numerical expressions such as a first, a second, and the like may be used to explain various components, but there is no limitation thereto. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not conflict with the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The example embodiments may have a variety of modifications and several embodiments. Accordingly, specific example embodiments will be illustrated in the drawings and described in greater detail in the detailed description part. However, this does not necessarily limit the scope of the example embodiments to a specific embodiment form. Instead, modifications, equivalents and replacements included in the disclosed concept and technical scope of this disclosure may be employed. While describing example embodiments, if it is determined that the specific description regarding a known technology obscures the gist of the disclosure, the specific description may be omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

The terms used herein are solely intended to explain example embodiments, and not to limit the scope of the present disclosure. It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term such as "module," "unit," "part", and so on may be used to refer to an element that performs at least one function or operation, and such element may be implemented as hardware or software, or any combination of hardware and software. Further, except for when each of a plurality of "modules", "units", "parts", and the like are to be realized in an individual hardware, the components may be integrated in at least one module or chip and be realized in at least one processor.

Also, when any part is connected to another part, this includes a direct connection and an indirect connection through another medium or component. Further, when a certain portion includes a certain element (based on a certain portion including a certain element), unless specified to the contrary, this means that another element may be additionally included, rather than precluding another element.

FIG. 1 is a diagram illustrating a system including an electronic apparatus and an external apparatus, according to an example embodiment.

An electronic apparatus 100 according to an example embodiment of FIG. 1 may communicate with an external apparatus 200 including, for example, a microphone. For example, the electronic apparatus 100 may be implemented as any electronic devices capable of performing a voice recognition, such as a display apparatus such as, for example, and without limitation, a TV, an audio apparatus such as a network sound bar, an Internet of Things (IoT) hub, a home network hub, a mobile apparatus, a navigation, and the like. In FIG. 1, an external voice input may be carried out by the external apparatus 200. However, it is also possible that an external voice input function is carried out by the electronic apparatus 100 itself.

The electronic apparatus 100 according to another example embodiment may, for example, and without limitation, receive a voice input via a built-in microphone or a microphone built in an external apparatus, and directly perform the voice recognition.

If the electronic apparatus 100 directly performs voice recognition, an artificial intelligence (AI) system for voice recognition may be provided. The AI system may refer, for example, to a computer system which implements intelligence, wherein a machine learns and determines by itself, and is a system of which the recognition rate is improved as it is used more. A voice input may be recognized through a linguistic understanding technology for recognizing languages/characters of a human being from among AI technologies. The linguistic understanding may refer, for example, to a technique of recognizing a language and character of human and applying and processing the same, which includes, for example, and without limitation, natural language processing, machine translation, conversation system, question and answer, voice recognition and synthesis and the like.

According to another example embodiment, an additional external apparatus with a built-in microphone may be provided, and the external apparatus may, for example, perform voice recognition processing for the voice input and provide the voice recognition result to the electronic apparatus 100.

The electronic apparatus 100 may be controlled based on the voice recognition result. For example, if the voice recognition result includes "Please show channel recommendation." preferred channels may be selected and information about the selected preferred channels may be provided through an output interface. In this case, the example may be a particular program or a particular content instead of a channel.

The external apparatus 200 may activate the microphone 230 by an audio request signal (microphone activation signal) received from the electronic apparatus 100. In addition, the external apparatus 200 may transmit input of an external voice received via the activated microphone 230 to the electronic apparatus 100. For example, the external apparatus 200 may be implemented as, for example, and without limitation, a remote controller, a mobile device such as a smartphone, a wearable device such as a smart watch, a pointing device, or the like.

In the example described above, the microphone 230 may be activated by an audio request signal (microphone activation signal) received from the electronic apparatus 100. However, in another implementation, the microphone 230 may be activated immediately when a voice recognition button (e.g., 211 of FIG. 9) included in the external apparatus 200 is pressed (based on a voice recognition button (e.g., 211 of FIG. 9) included in the external apparatus 200 being pressed). For example, when the user presses the voice recognition button of the external apparatus 200 (based on the user pressing the voice recognition button of the external apparatus 200), a microphone included in the external apparatus 200 may be activated and a user voice may be recognized. The external apparatus 200 may transmit the recognized user voice to the electronic apparatus 100. In the example embodiment described above, the microphone 230 is included in the external apparatus 200. However, as described above, the electronic apparatus 100 may include a microphone and the above-mentioned operation may be applicable to the microphone of the electronic apparatus 100.

Figure 2:
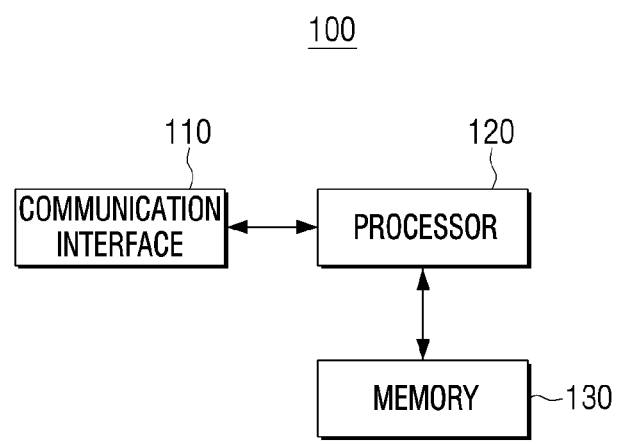
FIG. 2 is a block diagram illustrating an example configuration of an electronic apparatus, according to an example embodiment.

FIG. 2 is a block diagram illustrating an example configuration of an electronic apparatus, according to an example embodiment.

Referring to FIG. 2, the electronic apparatus 100 may include a communication interface (e.g., including communication circuitry) 110, a processor (e.g., including processing circuitry) 120, a memory 130, and a display 140.

The communication interface 110 may include various communication circuitry and communicate with the external apparatus 200 including a microphone. For example, the communication interface 110 may receive a control signal, an audio data, etc. from the external apparatus 200. In addition, the communication interface 110 may transmit an audio request signal (microphone activation signal) to the external apparatus 200.

The communication interface 110 may convert an RF signal received from the external apparatus 200 into a digital signal and transfer the digital signal into which the RF signal is converted to the processor 120.

The communication interface 110 may include, for example, and without limitation, a first communication interface configured to communicate in a first communication method, and a second communication interface configured to communicate in a second communication method different from the first communication method. When a voice input initiation signal is received from an external apparatus via the first communication interface (based on the user pressing the voice recognition button of the external apparatus 200), the processor 120 may establish a session with a voice recognition server by means of the second communication interface.

In addition, the communication interface 110 may receive, from an external apparatus, a voice input initiation signal provided by, for example, depressing a button of the external apparatus and information relating to a time for which the button is pressed. The processor 120 may, based on the time being greater than a predetermined time, control the communication interface 110 to block the established session on the basis of the received time information.

Further, the communication interface 110 may establish a session with a voice recognition server, and transmit a digital voice signal received from the external apparatus 100 to the voice recognition server via the established session. To this end, the communication interface 110 may include a variety of communication modules including various communication circuitry, such as, for example, and without limitation, one or more of a near-field wireless communication module (not illustrated), a wireless communication module (not illustrated), or the like. A near-field wireless communication module may refer, for example, to a module including circuitry for communicating with the external apparatus 200 located nearby according to a near-field wireless communication method such as Bluetooth (BT), Bluetooth Low Energy (BLE), Zigbee, and the like. In addition, the wireless communication module may refer, for example, to a module including circuitry which is connected to an external network according to a wireless communication protocol such as Wi-Fi, IEEE and the like, and performs communication. In addition to the above, the wireless communication module may further include a mobile communication module which includes circuitry to accesses a mobile communication network according to a variety of mobile communication standards such as 3rd generation (3G), 3rd Generation Partnership Project (3GPP), Long Term Evolution (LTE) and LTE Advanced (LTE-A) and which performs a communication.

The processor 120 may include various processing circuitry and controls the general operation of the electronic apparatus 100 and a signal flow between internal components of the electronic apparatus 100, and performs a function that processes data.

In addition, the processor 120 may control the communication interface 110 to communicate with the external apparatus 100 including a microphone. When a voice input initiation signal is received from the external apparatus 200, the processor 120 may execute a voice recognition application.

The processor 120 may control the communication interface 110 to establish a session with a voice recognition server before the voice recognition application is executed.

When the voice input initiation signal is received (based on the voice input initiation signal being received), the processor 120 may generate an event of executing the voice recognition application using middleware, control the communication interface 110 to transmit a signal for activating the microphone to the external apparatus 200, and control the communication interface 110 to establish a session with the voice recognition server.

In addition, when an audio data corresponding to a user utterance is received from the external apparatus 200, the processor 120 may control the communication interface 110 to transmit the received audio data to the voice recognition server via the established session.

In addition, when the voice input initiation signal is received, the processor 120 may identify (determine) whether a session with the voice recognition server has been established, if the session has been established, reset the established session, and if the session has not been established yet, control the communication interface 110 to establish a new session.

When the voice input initiation signal is received from the external apparatus 200, the processor 120 may control a display to display information relating to a progress of voice recognition. In this case, the display may be an element of the electronic apparatus 100, and may correspond to a display included in a display apparatus additionally connected to the electronic apparatus 100.

In a case where the display is included in the electronic apparatus 100, the processor 120 may directly control the display to display information relating to the voice recognition progress.

In a case that the electronic apparatus 100 is connected to an additional or external display apparatus, the processor 120 may transmit, to the display apparatus, a signal controlling the display apparatus to display the information relating to the voice recognition progress. This example will be described in greater detail below with reference to FIG. 3.

When the voice input initiation signal is received from the external apparatus 200, the processor 120 may execute a voice recognition application.

In addition, when the application is driven, the processor 120 may identify (determine) whether an audio data is being sent, and if the audio data is being sent, wait until the audio data transmission is complete.

Meanwhile, the processor 120 may further include a buffer, and when an audio data is received from the external apparatus 200 between a time when a signal for activating a microphone is sent and a time when a driving of the voice recognition application is completed, the electronic apparatus may store the received audio data in the buffer, and control the communication interface 110 to transmit the audio data stored in the buffer to the voice recognition server.

In addition, when receiving the audio data from the external apparatus 200, the processor 120 may control the communication interface 110 to establish a session with the voice recognition server.

The memory 130 may store software that may be run (executed) in the processor 120. For example, the memory 130 may store software including a voice recognition application 127, a middleware 123 relaying the voice recognition application 127 (see, e.g., FIG. 3), and the like.

In addition, the memory 130 may be temporarily store a data being processed in the processor 120 or waiting to be processed. For example, the memory 130 may store an audio data processed by the voice recognition application 127.

The memory 130 may be implemented as a non-volatile memory such as a flash memory, a hard disk drive (HDD) and a solid state drive (SSD). However, a part of the memory 130 may be implemented as a volatile memory such as a random-access memory (RAM). For example, the memory 130 may store a temporary storage data in a volatile memory area.

According to an example embodiment, an audio request signal may be sent to the external apparatus 200 at the same time as a driving of the voice recognition application is initiated. Accordingly, a time it takes to activate the microphone 230 of the external apparatus 200 is reduced, and thereby a time it takes to receive input of an audio data signal is reduced. Accordingly, the electronic apparatus 100 may receive an audio data before completion of driving of the voice recognition application. When an audio data is received between a time when the audio request signal is sent and a time when driving of the voice recognition application is completed, the processor 120 may control the memory 130 to store the received audio data.

In addition, the electronic apparatus 100 may further include an element such as an audio output interface (not illustrated) including various output interface circuitry configured to output a voice of a response message corresponding to a user voice. For example, the audio output interface may be implemented as, for example, and without limitation, a speaker, an output port, or the like.

As described above, the electronic apparatus 100 according to an example embodiment may preliminarily access the voice recognition server before the application is executed. Accessing to a voice recognition server and processing a data sending function at the earliest time when an audio data is received may ultimately advance a time of the voice recognition process, thereby reducing a processing time for providing a voice recognition result.

The electronic apparatus 100 according to an example embodiment may send the received digital voice signal to the voice recognition server. In addition, the voice recognition server may perform a Speech to Text (STT) function to convert a digital voice signal into text information. The voice recognition server may perform the STT function and convert a digital voice signal into text information, and search for information corresponding to the converted text information. In addition, the voice recognition server may transmit the information corresponding to the converted text information to the electronic apparatus 100. The voice recognition server described above may perform the STT function and the search function at the same time.

The voice recognition server may perform the STT function, and the search function may be performed by an additional server. In this case, a server performing the STT function may convert the digital voice signal into text information, and transmit the converted text information to an additional server performing the search function.

The electronic apparatus 100 according to another example embodiment may directly perform the STT function. The electronic apparatus 100 may convert a digital voice signal into text information, and transmit the converted text information to a voice recognition server. In this case, the voice recognition server may perform the search function. In addition, the voice recognition server may search for the information corresponding to the converted text information, and transmit the found information to the electronic apparatus 100. In the example embodiment described above, the electronic apparatus 100 receives a digital voice signal from the external apparatus 100. However, the example is not limited thereto, and an analog voice signal may be directly received by the electronic apparatus and converted into a digital signal. This will be described in greater detail below with reference to a function of the microphone 150 of the electronic apparatus 100. That is, it may be the external apparatus 200 or electronic apparatus 100 that converts an analog voice signal into a digital voice signal.

Figure 3:
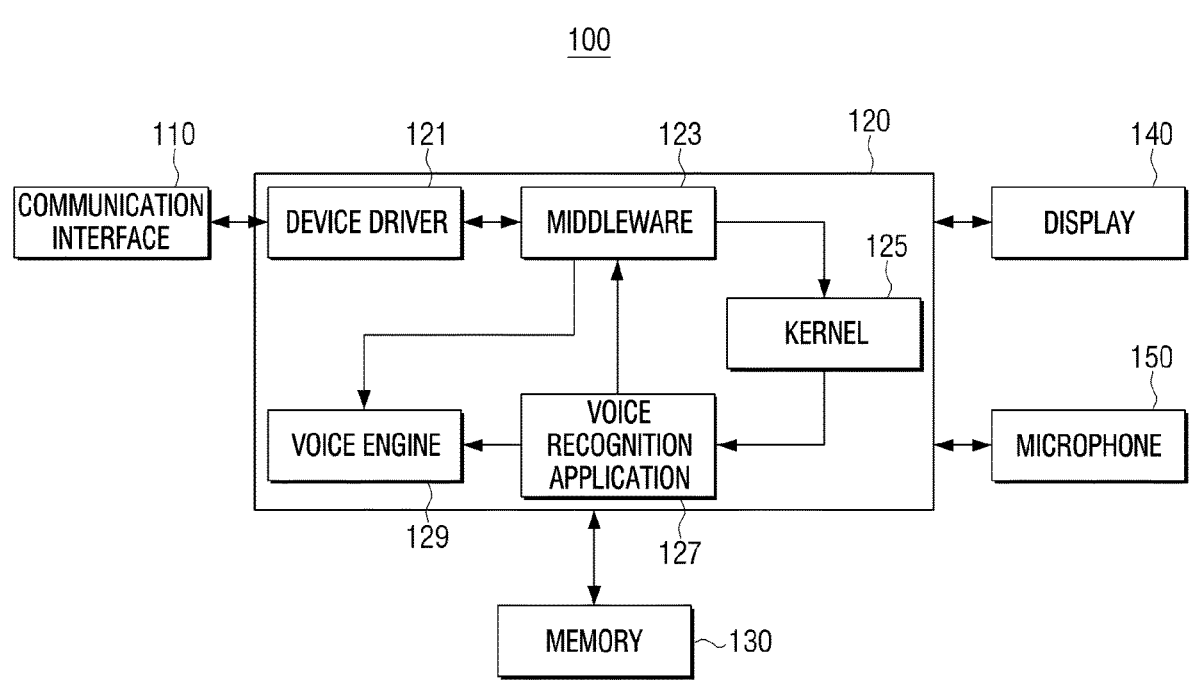
FIG. 3 is a block diagram illustrating a processor of an electronic apparatus, according to an example embodiment.

FIG. 3 is a block diagram illustrating an example processor of an electronic apparatus, according to an example embodiment.

For example, FIG. 3 illustrates an example software hierarchy which can be loaded from the memory 130 and execute by the processor 120, to explain an operation of the processor 120. A software stored in the memory 130 may include a plurality of hierarchical structures such as, for example, and without limitation, a device driver 121, a middleware 123, a kernel 125, a voice recognition application 127, and a voice engine 129. In addition, the electronic apparatus 100 may further include a display 140 and a microphone 150.

Operations of the communication interface 110 and memory 130 are explained with reference to FIG. 2, and thus explanation thereof is not repeated here.

The processor 120 may perform a voice recognition function. For example, the processor 120 may generate a signal for activating the microphone 230 of the external apparatus 200 using the middleware 123, thereby reducing a time it takes to initiate a voice input. In addition, the processor 120 may perform a validity test of the received audio data.

The processor 120 may execute software of a hierarchical structure. The processor 120 may perform transferring and processing of a control signal, or the like, by going through the respective layers of the software.

The device driver 121 may refer, for example, to an element belonging to a hardware layer. For example, the device driver 121 may control the communication interface 110 to perform a function of transceiving various types of signals and data with the external apparatus 200. The device driver 121 may transfer a digital signal received and converted from the communication interface 110 to the middleware 123.

The middleware 123 layer may relay a voice recognition application, or the like. The middleware 123 layer may, like a signal handler, include a middleware. The signal handler may perform a transfer path setting according to a packet analysis, data processing and data type of the digital signal.

For example, when a control signal (e.g., voice input initiation signal) is received from the external apparatus 200, the middleware 123 layer may transmit the received control signal to a kernel 125 layer and initiate driving of the voice recognition application 127, and simultaneously generate an audio request signal (microphone activation signal) and transmit the generated the generated audio request signal to a hardware layer such as the device driver 121. That is, the generation and transmission of the microphone activation signal may be performed on the middleware 123 layer.

As another example, when audio data is received from the external apparatus 200, the middleware 123 layer may transfer the received audio data to the application layer. The middleware 123 layer may drive the voice engine 129 to process the received audio data, regardless of driving of the voice recognition application 127.

The kernel 125 layer may include a kernel such as an event handler. The event handler may perform a function of transferring various events in the electronic apparatus 100. For example, when the received control signal is a voice button input data, the event handler may generate the corresponding event and transfer the generated event to a particular application.

The voice recognition application 127 and the voice engine 129 may belong to the application layer. The voice recognition application 127 may be an application in charge of processing related to voice recognition. That is, the voice recognition application 127 may be a program that actually handles an actual user voice input, etc. When an event is received, the voice recognition application 127 may drive the voice engine 129.

The voice engine 129 may process a voice data. For example, the voice engine 129 may process an audio data transferred from the signal handler which is the middleware 123. In addition, the voice engine 129 may receive a driving command from the signal handler which is the middleware 123 without receiving a driving command from the voice application 127. Accordingly, even before the voice recognition application 127 is executed, the voice engine 129 may process the received audio data.

The voice engine 129 may process the audio data on its own, and send the audio data to an external server via an additional communication interface (not illustrated). In addition, the voice engine 129 may receive an output value obtained from the external server.

The display 140 may be realized as, for example, and without limitation, a Liquid Crystal Display (LCD), an Organic Light Emitting Display (OLED), a Plasma Display Panel (PDP), or the like, and display various screens which can be provided through the electronic device.

For example, when a driving of the application 127 is completed, the display 140 may display the corresponding UI. Accordingly, at least after a time at which the UI is displayed, it may be identified that the driving of the voice recognition application 127 has been completed.

As another example, the display 140, may provide an interactive voice recognition function, display a response message corresponding to a user voice as a text or an image.

In this case, the display 140 may be an element included in the electronic apparatus 100. The processor 120 may control the display 140 to display information relating to a voice recognition progress on the display 140 included in the electronic apparatus 100.

The electronic apparatus 100 according to another example embodiment may not include a display and may be connected to an additional display apparatus. In this case, the processor 120 may control the communication interface 110 to transmit a video and audio signal to the additional display apparatus.

When the voice input initiation signal is received from the external apparatus 200, the processor 120 may control the communication interface 110 to transmit, to the display apparatus, a control signal for displaying information relating to a progress of voice recognition.

The electronic apparatus 100 according to another example embodiment may not include the display 140 and may be connected to an additional display apparatus. In this case, the display apparatus may be connected to the electronic apparatus 100 and receive a video and audio signal. The display apparatus may include a display and an audio output interface so that the video and audio signal may be received and output. The audio output interface may include various audio output interface circuitry, such as, for example, and without limitation, a speaker, a headphone output terminal, an S/PDIF output terminal for outputting an audio data, or the like.

The electronic apparatus 100 may include an output port for sending a video and audio signal to the display apparatus. In this case, the output port of the electronic apparatus 100 may be a port which is capable of sending the video and audio signal at the same time. For example, and without limitation, the output port may be an interface including one or more of a High Definition Multimedia Interface (HDMI), Display Port (DP), Thunderbolt, or the like.

The output port of the electronic apparatus 100 may include an additional port to send the video and audio signal, respectively.

In addition, the electronic apparatus 100 may use a wireless communication module including wireless communication circuitry to transfer the video and audio signal to the display apparatus. The wireless communication module may refer, for example, to a module including circuitry which is connected to an external network according to a wireless communication protocol such as Wi-Fi, IEEE and the like, and performs communication. In addition to the above, the wireless communication module may further include a mobile communication module which includes circuitry that accesses a mobile communication network according to a variety of mobile communication standards such as 3rd generation (3G), 3rd Generation Partnership Project (3GPP), Long Term Evolution (LTE) and LTE Advanced (LTE-A) and which performs a communication.

The microphone 150 in an activated state may receive a user voice. For example, the microphone 230 may, for example, and without limitation, be formed of an integral type integrated into an upper side, front surface direction, side direction, or the like, of the electronic apparatus 100. The microphone 150 may be an element for receiving a voice input. The microphone 150 may include a variety of components such as, for example, and without limitation, a microphone to collect a user voice of an analog format, an amplifier circuit to amplify the collected user voice, an analog/digital converter circuit to sample the amplified user voice and convert the sampled user voice to a digital signal, a filter circuit to remove a noise component from the converted digital signal, and the like.

A type, size, disposition, etc. of the microphone 150 may differ depending on types of operation to be implemented using a remote control apparatus, an outer appearance of the remote control apparatus, a usage patterns of the remote control apparatus, etc. For example, in a case that the remote control apparatus is implemented as a hexahedron including a rectangular front surface, the microphone 150 may be disposed on the front surface of the remote control apparatus.

The electronic apparatus 100 according to another example embodiment may include the microphone 150. In the example described above, a microphone is included in the external apparatus 200, and thus a user performs a voice recognition through the microphone of the external apparatus 200. However, the electronic apparatus 100 may include the microphone 150, as well. The user may perform the voice recognition through the microphone 150 of the electronic apparatus 100. Accordingly, all operations of the disclosure may be performed solely by the microphone 150 of the electronic apparatus 100 without the microphone 230 of the external apparatus 200.

Figure 4:
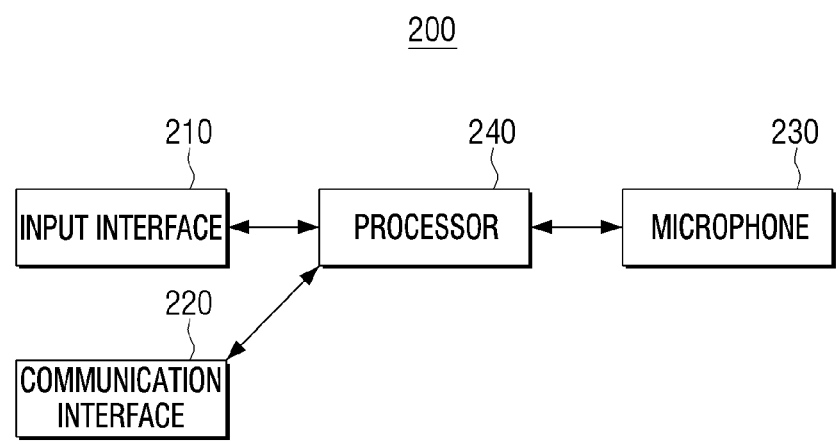
FIG. 4 is a block diagram illustrating an example configuration of an external apparatus, according to an example embodiment.

FIG. 4 is a block diagram illustrating an example configuration of an external apparatus, according to an example embodiment.

Referring to FIG. 4, the external apparatus 200 may include an input interface (e.g., including input interface circuitry) 210, a communication interface (e.g., including communication circuitry) 220, a microphone 230, and a processor (e.g., including processing circuitry) 240.

The input interface 210 may include various input interface circuitry and perform a function to receive input of a user command. The input interface 210 may be implemented as various input interface circuitry, such as, for example, and without limitation, a button, a touch pad, a widget, a keypad, or the like. In addition, the input interface 210 may use various methods for pressing the same button, and thereby different user commands may be received. For example, the input interface 210 may include a voice recognition button. When the user presses the voice recognition button, the external apparatus 200 may send a control signal indicating that the voice recognition button of the electronic apparatus 100 has been pressed. As another example, in a case that the external apparatus 200 is a mobile device such as a smartphone, when the user presses an application execution icon for performing a voice recognition function, the external apparatus 200 may send a control signal for initiating the voice recognition function to the electronic apparatus 100.

The communication interface 220 may include various communication interface circuitry and perform transmission and reception with the electronic apparatus 100 to be controlled. The communication interface 220 may include a wireless communication module including wireless communication circuitry and perform a wireless communication function with the electronic apparatus 100. For example, the communication interface 220 may send a control signal corresponding to a button input to the input interface 210 of the electronic apparatus 100, an audio data received from the microphone 230, and etc. Also, the communication interface 220 may receive an audio request signal from the electronic apparatus 100.

The communication interface 220 communicates with the electronic apparatus 100 according to various types of communication methods. The communication interface 220 may, for example, and without limitation, send an InfraRed (IR) signal to the electronic apparatus 100. The IR signal may refer, for example, to a unidirectional communication, and thus for bidirectional communication, the communication interface 220 may include various communication chips or modules including various circuitry supporting a wireless communication. For example, the communication interface 220 can include chips including circuitry which operate in manner of wireless Local Area Network (LAN), Wi-Fi, Bluetooth (BT), near field communication (NFC), or the like.

The microphone 230 in an activated state may receive a user voice. For example, the microphone 230 may be formed of an integral type integrated into an upper side, front surface direction, side direction, etc. of the external apparatus 200. The microphone 230 may be an element for receiving a voice input. The microphone 230 may include a variety of components such as, for example, and without limitation, a microphone to collect a user voice of an analog format, an amplifier circuit to amplify the collected user voice, an analog/digital converter circuit to sample the amplified user voice and convert the sampled user voice to a digital signal, a filter circuit to remove a noise component from the converted digital signal, and the like.

A type, size, disposition, etc. of the microphone 230 may differ depending on types of operation to be implemented using a remote control apparatus, an outer appearance of the remote control apparatus, a usage patterns of the remote control apparatus, etc. For example, in a case that the remote control apparatus is implemented as a hexahedron including a rectangular front surface, the microphone may be disposed on the front surface of the remote control apparatus.

The processor 240 may include various processing circuitry and control an overall operation of the external apparatus 200. The processor 240 may include a module to control a central processing unit (CPU) and the external apparatus 200, and read only memory (ROM) and random access memory (RAM) to store data. As another example, for compactness, the processor 240 may be implemented using, for example, and without limitation, a Micro Controller Unit (MCU).

When an audio request signal is received from the electronic apparatus 100, the processor 240 may control the microphone 230 to be activated and to receive input of a voice signal. In addition, the processor 240 may control the communication interface 220 to send an audio data input through the microphone 230 to the electronic apparatus 100.

Figure 5:
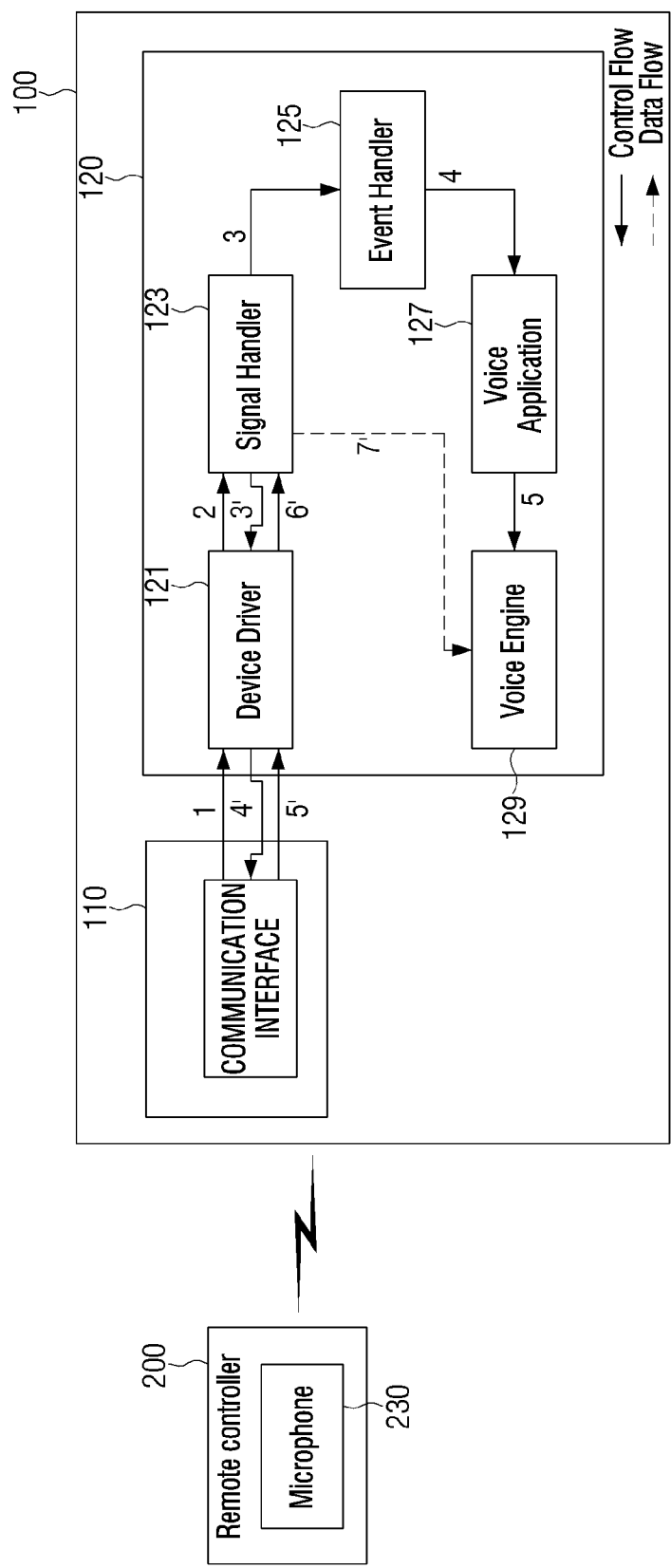
FIG. 5 is a diagram illustrating an example control signal and data flow in an electronic apparatus, according to an example embodiment.

FIG. 5 is a diagram illustrating an example control signal and data flow in an electronic apparatus, according to an example embodiment.

FIG. 5 is a diagram illustrating an example control signal and data flow in an electronic apparatus 100, according to an example embodiment. In FIG. 5, an order of flow of a control signal and data signal is indicated by numbers. For example, the "3" and the "3'" may indicate that a signal handler sends a signal at the same time, and it is not necessary that the respective routes are relevant to each other or that a synchronization is necessary.

The communication interface 110 may receive a control signal from the external apparatus 200 and transfer the received control signal to the device driver 121 which is a hardware layer of the processor 120, at step 1. For example, the communication interface 110 may convert a BT signal received by the external apparatus 200 into a digital signal and transfer the digital signal into which the BT signal has been converted to the device driver 121. The device driver 121 may transfer the transferred control signal (digital signal) to a signal handler which is a middleware layer, at step 2.

The signal handler may analyze and processes the transferred digital signal and set a transfer route according to types of data. For example, if a type of data corresponds to a button input for voice recognition and voice signal processing, the signal handler may transfer the data to the event handler 125 which is a kernel layer, at step 3. Simultaneously, the signal handler may transfer the audio request signal to the device driver 121, at step 3'. The audio request signal may be sent to the external apparatus 200 via the device driver 121 and the communication interface 110, at step 4'. The external apparatus 200 receiving the audio request signal may activate the microphone 230 and receive input of an audio data.

The external apparatus 200 may send the received audio data to the electronic apparatus 100. The audio data received from the communication interface 110 may be transferred to the signal handler via the device driver 121, at steps 5' and 6'. When the received signal is an audio data, the signal handler may transfer the received audio data to the voice engine 129, at step 7'. As another example, the signal handler may transfer the received audio data to the voice recognition application 127 rather than the voice engine 129.

The event handler 125 may generate an event and execute the voice recognition application 127, at step 4. In addition, the voice recognition application 127 may drive the voice engine 129 to process the audio data, at step 5. While this operation is performed, operations of steps 3' to 7' may be carried out, and thus it is possible to prevent and/or reduce loss of an initial input voice of the user.

According to another example embodiment, the electronic apparatus 100 may directly processes an audio data. However, the audio data may be processed by an external voice recognition server.

Figure 6:
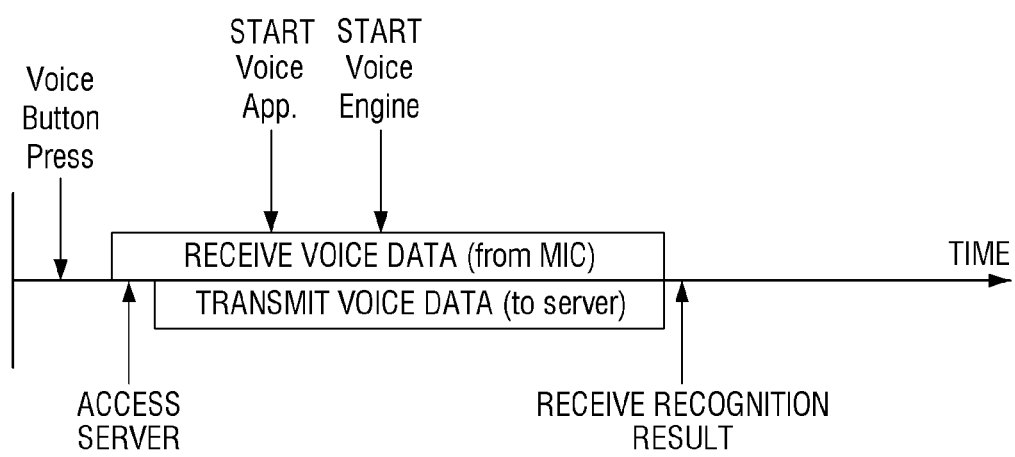
FIG. 6 is a diagram illustrating an example operation of transmitting a voice data of an electronic apparatus, according to an example embodiment.

FIG. 6 is a diagram illustrating an example operation of transmitting a voice data of an electronic apparatus, according to an example embodiment.

Referring to FIG. 6, the external apparatus 200 may send a voice recognition initiation signal to the electronic apparatus 100 in a manner that a button is pressed. When the voice recognition initiation signal is received, the electronic apparatus 100 may receive a voice data before an application is started. When the voice data is received, the processor 120 may control the communication interface 110 to establish a session with the voice recognition server.

In addition, the processor 120 may send an audio data received from the external apparatus 200 to the voice recognition server after the session with the voice recognition server is established. Then, the processor 120 may execute a voice application, and drive the voice application.

Meanwhile, the processor 120 may access the voice recognition server and send the audio data to the voice recognition server regardless of whether the voice application is executed or not.

The voice recognition result may be received by the electronic apparatus 100. In a case that the voice application is driven at the time when the voice recognition result is received, the electronic apparatus 100 may store the voice recognition result via the voice application, and provide the stored voice recognition result to the user. If the voice application is not driven at the time when the voice recognition result is received, the voice recognition result may be displayed to the user after the voice recognition result is stored in the memory 130 and the voice application is driven. However, it is possible to provide the voice recognition result to the user via a different UI without waiting for the voice application to be driven and regardless of whether the voice application is driven.

Figure 7:
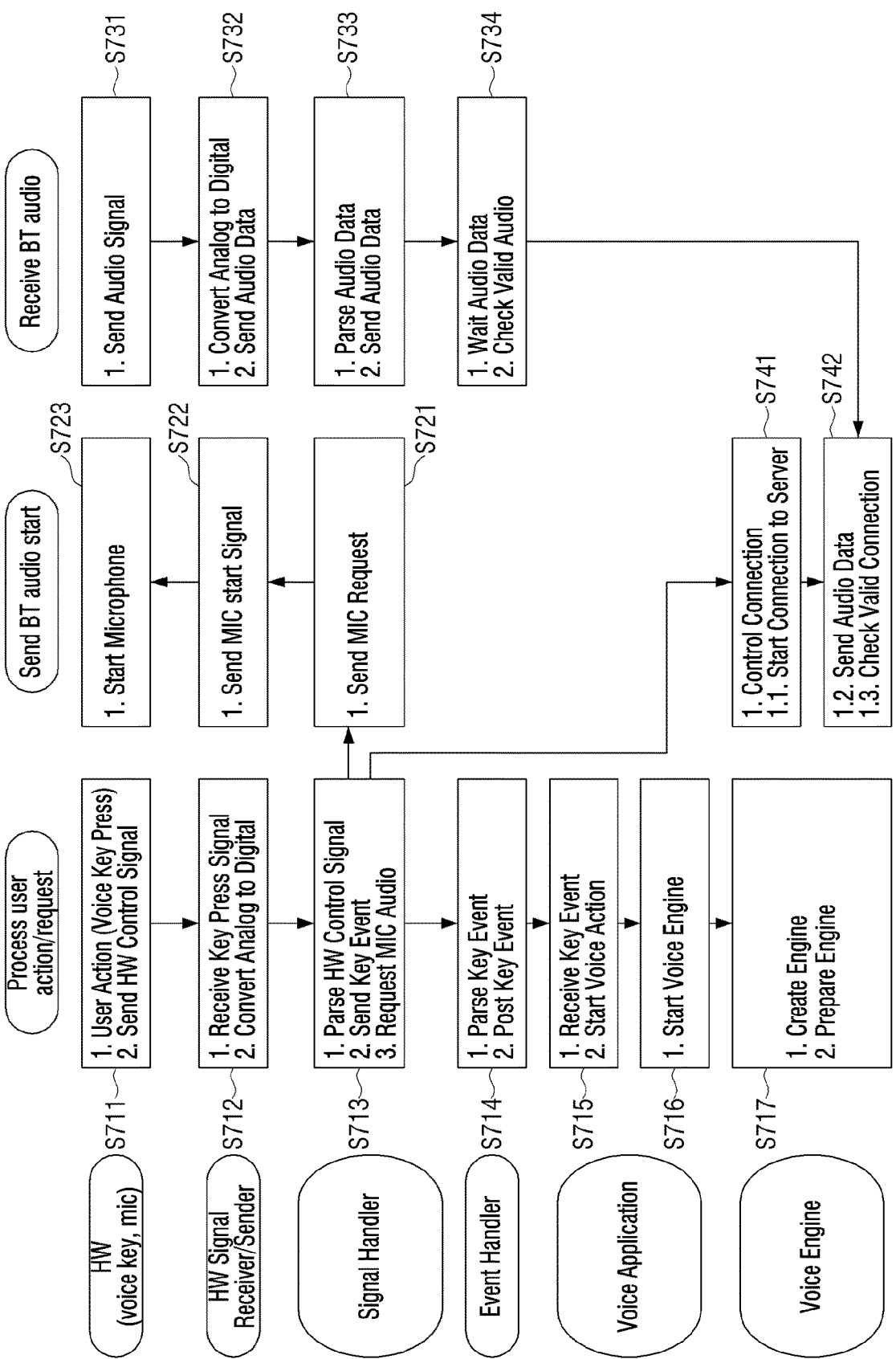
FIG. 7 is a diagram illustrating an example operation of an electronic apparatus, according to an example embodiment.

FIG. 7 is a diagram illustrating an example operation of an electronic apparatus, according to an example embodiment.

In FIG. 7, it is assumed that the microphone 150 is included as one element of the electronic apparatus 100. Even if integrally formed, a signal handler, which may, for example be middleware, may transfer an event signal to an event handler which is a kernel based on a voice key input, and simultaneously transfer the audio request signal for activating the built-in microphone 150 to the microphone 150.

When a button (e.g., voice recognition button) is pressed by a user, the input interface (not illustrated) may send a control signal to the processor 120, at operation S711. Then, a hardware signal transceiver, which is a hardware layer, may convert the received signal to a digital signal and transfer the digital signal into which the received signal has been converted to a middleware layer, at operation S712.

The signal handler may analyze a hardware control signal and perform the corresponding operation. The signal handler may generate a key event and transfer the generated key event to the event which is a kernel. Simultaneously, the signal handler may request an audio to the microphone 150, at operation S713.

The signal handler generates a key event and transfers the generated key event to the event handler, and simultaneously transmits an audio request signal to the microphone 150 at operation S721 and establishes a session at operation S741 to access the voice recognition server, and thus the operations S721 and S741 may be carried out simultaneously with the operation S714.

Herein, the operation of establishing the session with the voice recognition server may be carried out in the voice engine. However, an additional voice engine for establishing the session with the voice recognition server rather than the voice engine 129 by execution of the application as illustrated in the operation S717 may be driven.

The event handler may analyze the key event and post the key event and control the voice recognition application 127 to be driven, at operations S714 and S715. In addition, the voice recognition application 127 may drive the voice engine 129, at operation S716.

While the voice recognition application is driven 127, the hardware signal transceiver may send an audio request signal to the built-in microphone 150, at operation S722. Then, by receiving the audio request signal, the microphone 150 may be activated at operation S723.

The activated microphone 150 may receive an audio data such as a user voice, at operation S731. In addition, the microphone 150 may transfer the received audio data to the hardware signal transceiver. The hardware signal transceiver may convert the audio data to a digital signal, and transfer the digital signal to which the audio data is converted to the signal handler which is a middleware layer, at operation S732. In addition, the signal handler may transfer the received audio data to the event handler, at operation S733.

The event handler may perform a validity test of the received data, and then send the audio data to a voice engine for which a session has been established, at operation S734. The voice engine may send the audio data to a voice recognition server by means of the established session, at operation S742.

Through the operation as described above, even in the electronic apparatus 100, an audio request signal may be transferred to the microphone 150 before driving of the voice recognition application is completed, and thereby the activation time of the microphone 150 can be reduced.

In addition, the electronic apparatus 100 may preemptively access the voice recognition server and send the audio data in advance, and thus the voice recognition result can be provided to the user more quickly.

Figure 8:
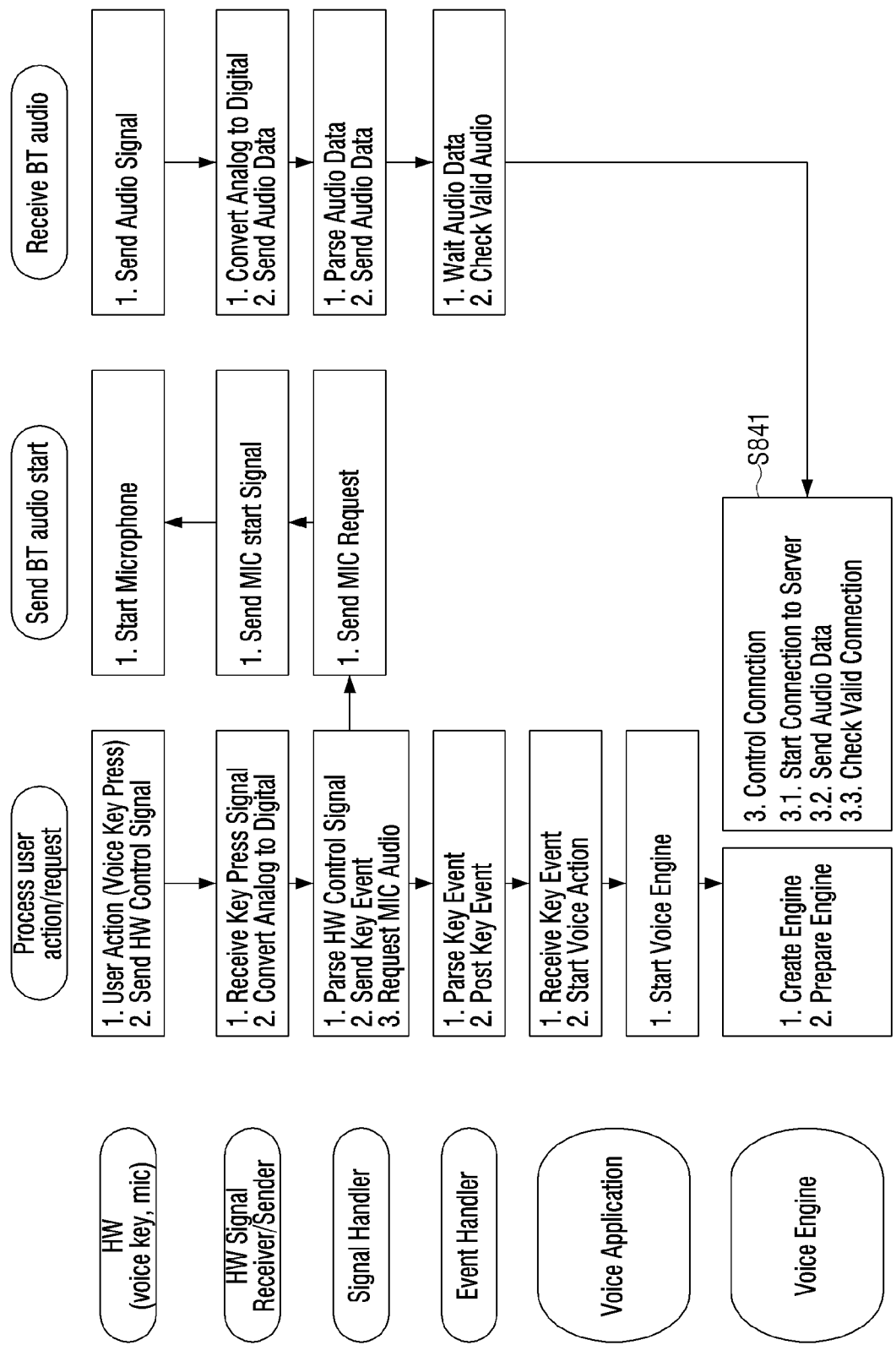
FIG. 8 is a diagram illustrating an example operation of an electronic apparatus, according to another example embodiment.

FIG. 8 is a diagram illustrating an example operation of an electronic apparatus, according to another example embodiment.

In FIG. 7, the signal handler generates a key event and transfers the generated key event to an event handler, and simultaneously sends the audio request signal to the microphone 150 at operation S721 and establish a session to access the voice recognition server at operation S741.

However, referring to FIG. 8, the signal handler may generate a key event and transfer the generated key event to an event handler, and simultaneously sends the audio request signal to the microphone 150 at operation S721, and may establish a session to access the voice recognition server after the audio data is received, at operation S841.

For example, after the audio data is received from the external apparatus 200 and then the event handler performs a validity test of the received audio data, a session with the voice recognition server may be established and an audio data may be sent to the voice recognition server, at operation S841.

In addition, an operation of establishing a session with the voice recognition server and sending the audio data to the voice recognition server may be performed in the voice engine, which may be a voice engine separate from the voice engine 129 driven by executing of the application.

Figure 9:
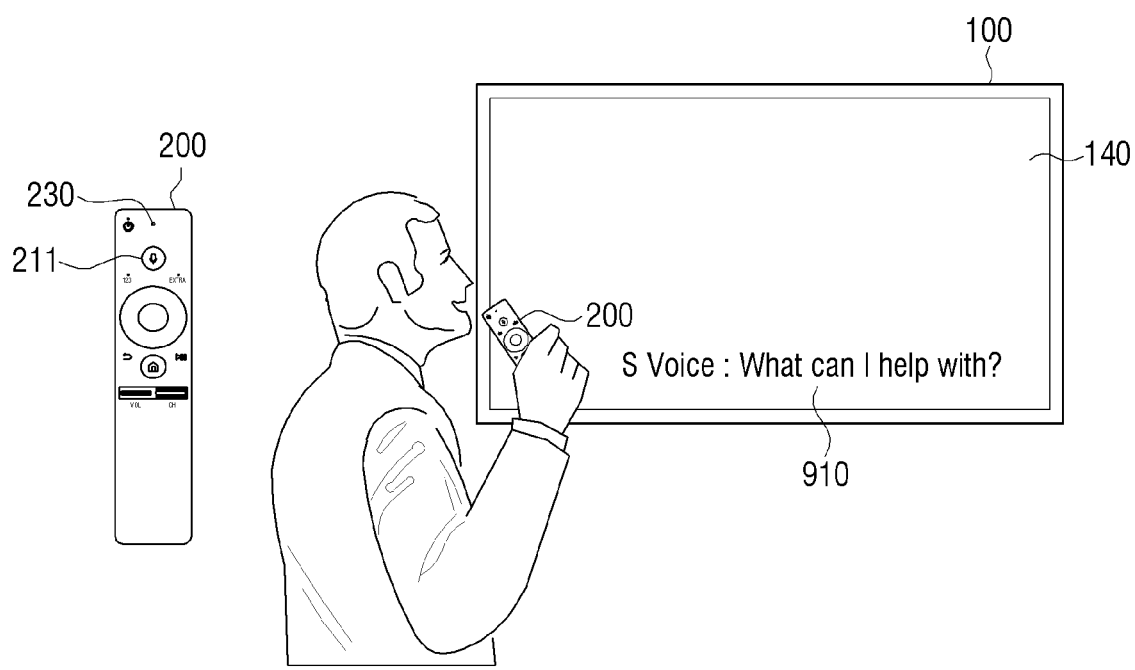
FIG. 9 is a diagram illustrating an example embodiment in which a user interface (UI) is displayed.

FIG. 9 is a diagram illustrating an example embodiment in which a user interface (UI) is displayed.

Referring to FIG. 9, when the voice recognition application 127 is executed and it is a time at which a processing is possible, it may be identified that a voice recognition available UI 910 as illustrated in FIG. 9, in the electronic apparatus 100 including the display 140. The electronic apparatus 100 not including the display 140 may notify the user of a time when a voice recognition processing is available by means of an indicator such as an LED.

In related art, even after the UI (indicator) is displayed (that is, the voice recognition application is loaded and driving is completed), a voice input is unavailable for a predetermined initial time, thus disabling the voice recognition function. However, in the electronic apparatus 100 according to an example embodiment, a faster voice input is available than displaying a UI (or driving of the voice recognition application is completed), and thus no initial user voice is lost.

As illustrated in FIG. 9, the user may press the voice recognition button 211 of the external apparatus 200 for execution of the voice recognition function. For example, a button may be implemented in various types such as, for example, and without limitation, a touch button, a soft key, a hard key, and the like.

As another example, the external apparatus 200 may be implemented as, for example, and without limitation, a mobile apparatus and wearable device such as a smartphone, a smart watch, and the like. An operation of clicking on an audio function application executing icon displayed on a smartphone screen may correspond to an operation of pressing a voice recognition button of a remote controller.

The electronic apparatus 100 according to an example embodiment may, as illustrated in FIG. 8, process a user voice input not only after a UI indicating that the voice recognition application 127 has been execute is displayed but also for a predetermined time before the UI is displayed.

As compared with a case that it is impossible or unable to process a user voice for an initial predetermined time even after the UI is displayed, the electronic apparatus 100, at the middleware layer, according to an example embodiment may preemptively send a signal for activating the microphone 230, and thus the electronic apparatus 100 may process a user voice after an activation time of the microphone even before a UI indicating that driving of the voice recognition application has been completed is displayed.

For example, the signal handler, which is a middleware, may generate an audio request signal to activate the microphone 230, and generate a signal driving the voice engine 129 as well. Accordingly, the electronic apparatus 100 according to an example embodiment may process a voice input even before driving of the voice recognition application is completed.

Figure 10:
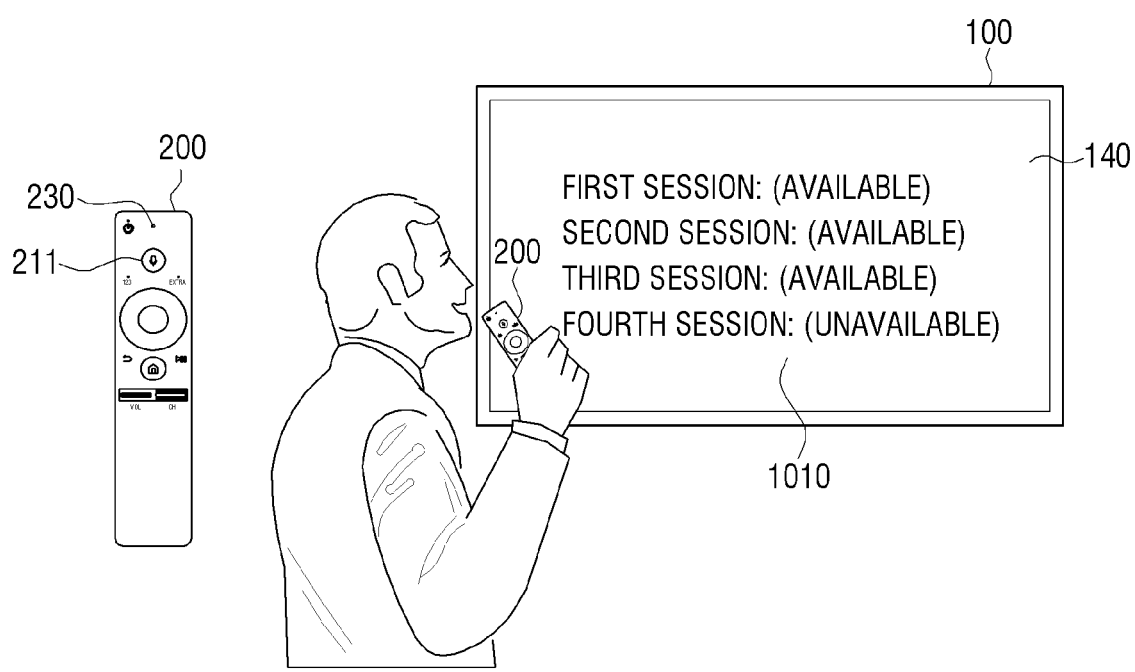
FIG. 10 is a diagram illustrating another example embodiment in which a user interface (UI) is displayed.

FIG. 10 is a diagram illustrating another example embodiment in which a user interface (UI) is displayed.

Referring to FIG. 10, the electronic apparatus 100 may identify (determine) whether it is possible to establish a session with a voice recognition server. In addition, the electronic apparatus 100 may identify (determine) whether it is possible to establish a session for all sessions capable of establishing a session with the voice recognition server. For example, to identify whether it is possible to establish a session, the electronic apparatus 100 may use at least one information from among terms, an account, and a network state.

Herein, the electronic apparatus 100 may display, on the display 140, whether it is possible to establish the respective sessions 1010.

Figure 11:
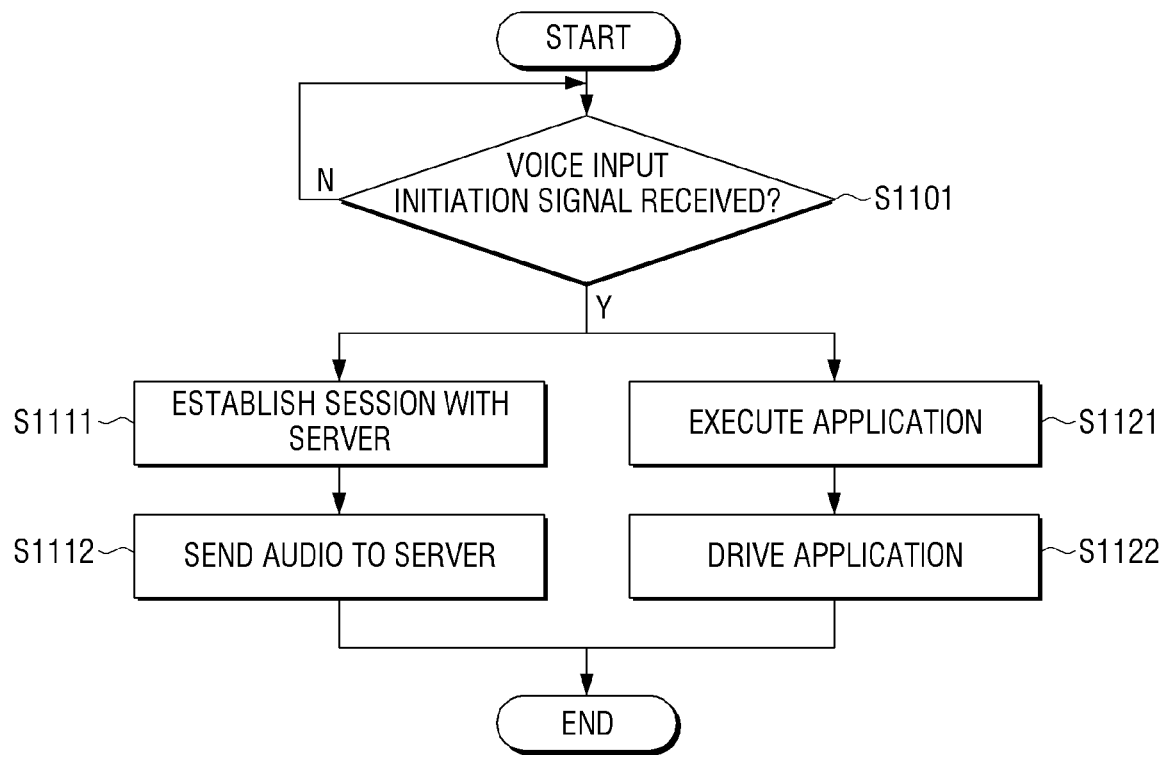
FIG. 11 is a flowchart illustrating an example method for controlling an electronic apparatus, according to an example embodiment.

FIG. 11 is a flowchart illustrating an example method for controlling an electronic apparatus, according to an example embodiment.

The electronic apparatus 100 may identify (determine) whether a voice input initiation signal has been received from the external apparatus 200, at operation S1101. Herein, when the voice input initiation signal is received, the electronic apparatus 100 may, while simultaneously establishing a session with a server at operation S1111, and execute a voice application at operation S1121.

The electronic apparatus 100 may establish a session with the voice recognition server, and send an audio data to the voice recognition server by means of the established session, at operation S1112.

Meanwhile, when an application is executed, the application may be driven at operation S1122, and the application may be driven after an operation of establishing a session with the server and sending an audio data to the server.

Figure 12:
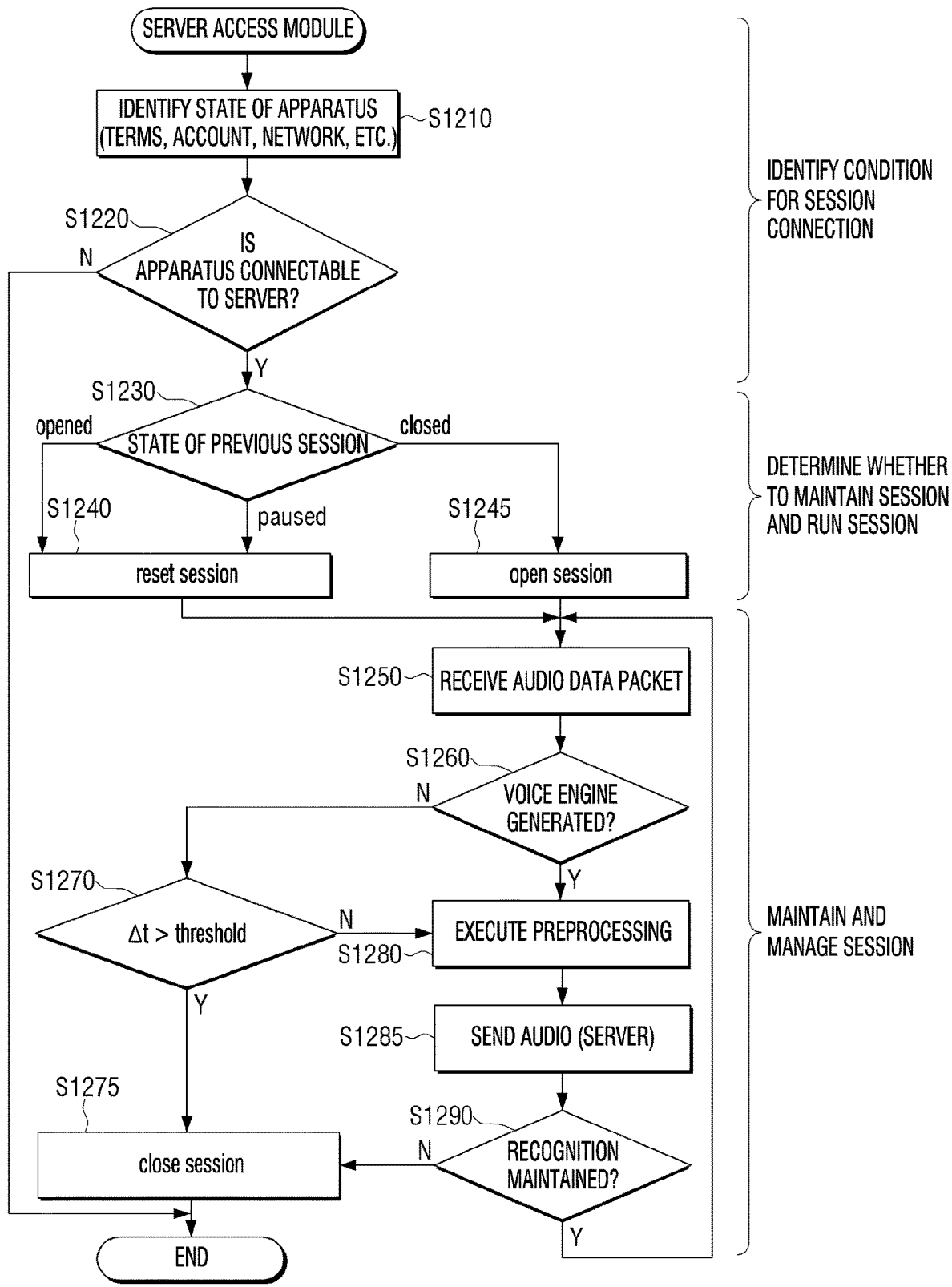
FIG. 12 is a flowchart illustrating an example server access module of an electronic apparatus, according to an example embodiment.

FIG. 12 is a flowchart illustrating an example server access module of an electronic apparatus, according to an example embodiment.

The electronic apparatus may identify and use at least one information from among, for example, and without limitation, terms, an account, and a network state, to identify (determine) whether it is possible to establish a session with the voice recognition server, at operation S1210. When the electronic apparatus 100 is in a state of being capable of establishing a session with a particular server, the electronic apparatus 100 may identify (determine) whether it is possible to establish a session with the voice recognition server, at operation S1220.

In a case that the voice recognition server corresponds to a state to establish a session with the electronic apparatus 100, a state of the previous session may be identified (determined) at operation S1230. In a case that the state of the previous session has already been connected (OPEN) or in a standby (PAUSED) state, the electronic apparatus 100 may reset the session, at operation S1240. Meanwhile, in a case that the state of the previous session is blocked (CLOSED), a new session may be established at operation S1245.

Herein, the electronic apparatus 100 may receive an audio data packet from the external apparatus 200, at operation S1250. In addition, the electronic apparatus 100 may identify (determine) whether a voice engine is generated, at operation S1260.

In a case that the voice engine is not generated, the electronic apparatus 100 may identify (determine) whether a user intention is to drive a voice engine. For example, the user may click a button of the external apparatus 200 and send a voice input initiation signal to the electronic apparatus 100, and the electronic apparatus 100 may receive information relating to a time for which the button is pressed. The electronic apparatus 100 may identify (determine) whether the time for which the button is pressed has a value greater than a predetermined time, at operation S1270. If the time for which the button is pressed is a greater value than the predetermined time, the electronic apparatus 100 may identify (determine) that the user has pressed a wrong button, and block the established session, at operation S1275. In addition, if the time for which the button is pressed is less than or equal to the predetermined time, a data processing (execution of preprocessing) operation for improving voice recognition performance may be performed at operation S1280.

In a case that a voice engine is generated, the electronic apparatus 100 may perform a data processing (execution of preprocessing) operation for improving the voice recognition performance, at operation S1280. Then, the electronic apparatus 100 may send an audio data to the voice recognition server by means of the established session, at operation S1285.

The electronic apparatus 100 may identify (determine) whether to maintain the voice recognition function, at operation S1290, and if it is identified (determined) that the voice recognition function is maintained, receive the audio data packet again, at operation S1250. Meanwhile, the electronic apparatus 100 may block the established session when it is identified that the voice recognition function is not to be maintained, at operation S1275.

Figure 13:
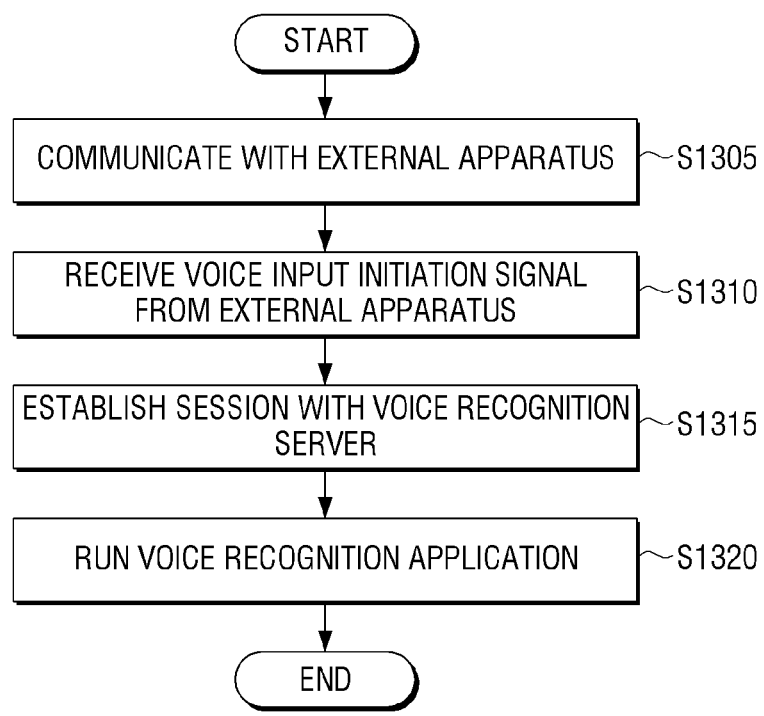
FIG. 13 is a flowchart illustrating an example method for controlling an electronic apparatus, according to an example embodiment.

FIG. 13 is a flowchart illustrating an example method for controlling an electronic apparatus, according to an example embodiment.

Referring to FIG. 13, the electronic apparatus 100 according to an example embodiment may communicate with the external apparatus 200 via a predetermined wireless methods, at operation S1305. In addition, a method for controlling the electronic apparatus 100 may include receiving a voice input initiation signal from the external apparatus 200, at operation S1310, establishing a session between the electronic apparatus 100 with the voice recognition server, at operation S1315, and executing a voice recognition application stored in the memory 130, at operation S1320.

Meanwhile, the method for controlling the electronic apparatus 100 may further include generating a signal for activating a microphone and transmitting the generated signal to the external apparatus 200 by means of a middleware relaying a voice recognition application stored in a software. The executing the voice recognition application may include generating an event to execute a voice recognition application by means of the middleware.

When an audio data corresponding to a user utterance is received from the external apparatus 200, the method for controlling the electronic apparatus 100 may further include sending an audio data received by the voice recognition server by means of the established session.

The establishing the session with the voice recognition server may include, when a voice input initiation signal is received, identifying (determining) whether a session with the voice recognition server has been established, if the session has been established, resetting the established session, and if the session has not been established, establishing a new session.

The establishing the session with the voice recognition server may include, when an audio data is received from the external apparatus 200, establishing a session with the voice recognition server.

The method may further include, when a voice input initiation signal is received from the external apparatus 200, displaying information about a voice recognition progress.

When the application is driven, the processor 120 may identify (determine) whether an audio data is being sent, and if the audio data is being sent, wait until the audio data transmission is complete.

In addition, the method may further include, when an audio data is received from the external apparatus 200 between a time when a signal for activating a microphone is sent and a time when a driving of the voice recognition application is completed, storing the received audio data in the buffer, and transmitting the audio data stored in the buffer to the voice recognition server.

The receiving the voice input initiation signal from the external apparatus 200 may include receiving a voice input initiation signal in a first communication method. The sending the audio data received by the voice recognition server may include sending an audio data received in a second communication method different from the first communication method.

The receiving the voice input initiation signal from the external apparatus 200 may include generating the voice input initiation signal by a button of the external apparatus 200, receiving information relating to a time for which the button is pressed by the external apparatus 200, and if the time for which the button is pressed is larger than a predetermined time, blocking the established session by means of the received information for which the button is pressed.

As described above, the method for controlling the electronic apparatus 100 according to an example embodiment may preliminarily access the voice recognition server before the application is executed. Accessing to a voice recognition server and processing a data sending function at the earliest time when an audio data is received may ultimately advance a time of the voice recognition process, thereby reducing a processing time for providing a voice recognition result.

Various example embodiments described above may be embodied in a recording medium that may be read by a computer or a similar apparatus to the computer using software, hardware, or any combination thereof. According to an example hardware embodiment, example embodiments that are described in the present disclosure may be embodied by using, for example, and without limitation, at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units (circuitry) for performing other functions. In some cases, various example embodiments described herein may be implemented by processor 120 itself. According to a software implementation, embodiments such as the procedures and functions described herein may be implemented with separate software modules. Each of the software modules may perform one or more of the functions and operations described herein.

Meanwhile, the computer instructions for carrying out a processing operation in the electronic apparatus according to various example embodiments of the present disclosure described above may be stored in a non-transitory computer-readable medium. Computer instructions stored on such non-transitory computer-readable medium may cause a particular device to perform processing operations in the electronic apparatus according to various example embodiments described above when executed by a processor of the particular device.

The non-transitory computer readable recording medium may refer, for example, to a medium that stores data semi-permanently, and is readable by an apparatus. For example, the aforementioned various applications or programs may be stored in the non-transitory computer readable recording medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely illustrative and are not to be understood as limiting the present disclosure. The present disclosure may be readily applied to other types of devices. Also, the description of the various example embodiments of the present disclosure is intended to be illustrative, and not to limit the scope of the claims, and many alternatives, modifications, and variations will be apparent to those skilled in the art.

What is claimed is:

1. An electronic apparatus, comprising:
   a display;
   a communication interface comprising communication circuitry;
   a memory configured to store a voice recognition application configured to process audio data and provide user interface including information related to a voice recognition result; and
   a processor configured to:
   based on receiving a voice input initiation signal, identify whether a session with the external server is established,
   based on the session not being established, control the communication interface to establish a session with an external server,
   based on the session being established, reset the established session,
   based on receiving a user voice input before execution of the voice recognition application is started by the electronic apparatus, control the communication interface to transmit data corresponding to the user voice input to the external server using the established session,
   start execution of the voice recognition application by the electronic apparatus after the session with the external server is established and after at least a portion of the data corresponding to the user voice input is transmitted to the external server,
   control the communication interface to receive a voice recognition result corresponding to the transmitted data from the external server,
   perform a function, controlled by the voice recognition application, corresponding to the voice recognition result received from the external server,
   based on the voice recognition application not being executed at the time when the voice recognition result is received, store the voice recognition result in the memory, and control the display to display the stored voice recognition result after the voice recognition application is executed,
   wherein the data corresponding to the user voice input is transmitted to the external server while the user voice input is received,
   wherein the external server is a server to provide the voice recognition result corresponding to the user voice input,
   wherein the voice recognition application is an application executed by the electronic apparatus to store the voice recognition result and to provide the user interface including information related the voice recognition result provided by the external server, and
   wherein the processor is further configured to identify whether the data corresponding to the user voice input is being received when the voice recognition application is executed, and delay the performing the function corresponding to the voice recognition result until the receiving of the data corresponding to the user voice input is completed.

2. The electronic apparatus as claimed in claim 1, wherein the communication interface is configured to communicate with an external apparatus including a microphone,
   wherein the memory is configured to store a software including a middleware configured to relay the voice recognition application, and
   wherein the processor is configured to:
   based on receiving the voice input initiation signal, generate an event to perform the voice recognition via the middleware, and control the communication interface to send a signal for activating the microphone to the external apparatus.

3. The electronic apparatus as claimed in claim 1, wherein the processor is configured to:
receive the data corresponding to the user voice input from an external apparatus, and
control the communication interface to start transmitting the received data to the external server before the function corresponding to the voice recognition is performed.

4. The electronic apparatus as claimed in claim 2, further comprising a buffer, and
wherein the processor is configured to:
receive the data corresponding to the user voice input,
store the received data in the buffer between a time when a signal for activating the microphone is sent and a time when driving of the voice recognition is completed, based on the data being received from the external apparatus, and
control the communication interface to send the data stored in the buffer to the external server.

5. The electronic apparatus as claimed in claim 1, wherein the processor is configured to:
control the communication interface to establish the session with the external server based on receiving the data.

6. The electronic apparatus as claimed in claim 1, further comprising:
wherein the processor is configured to:
control the display to display information relating to a voice recognition progress based on receiving the voice input initiation signal.

7. The electronic apparatus as claimed in claim 1,
wherein the communication interface is configured to communicate with an external apparatus including a microphone,
wherein the communication interface is configured to include:
a first communication interface comprising communication circuitry configured to perform communication in a first communication method, and
a second communication interface comprising communication circuitry configured to perform communication in a second communication method different from the first communication method,
wherein the processor is configured to:
establish the session with the external server via the second communication interface based on receiving the voice input initiation signal from the external apparatus via the first communication interface.

8. The electronic apparatus as claimed in claim 1, wherein the communication interface is configured to:
communicate with an external apparatus including a microphone, and
receive, from the external apparatus, the voice input initiation signal based on a button press of the external apparatus and information relating to a time for which the button is pressed, and
wherein the processor is configured to:
control the communication interface to block the established session based on the received information relating to the time for which the button is pressed, based on the time for which the button is pressed being greater than a predetermined time.

9. A method for controlling an electronic apparatus configured to store a voice recognition application configured to process audio data and provide user interface including information related to a voice recognition result, the method comprising:
based on receiving a voice input initiation signal, identifying whether a session with the external server is established;
based on the session not being established, establishing a session with an external server;
based on the session being established, resetting the established session;
based on receiving a user voice input before execution of the voice recognition application is started by the electronic apparatus, transmitting data corresponding to the user voice input to the external server using the established session;
starting execution of the voice recognition application by the electronic apparatus after the session with the external server is established and after at least a portion of the data corresponding to the user voice input is transmitted to the external server;
receiving a voice recognition result corresponding to the transmitted data from the external server;
performing a function, controlled by the voice recognition application, corresponding to the voice recognition result received from the external server, and
based on the voice recognition application not being executed at the time when the voice recognition result is received, storing the voice recognition result in a memory of the electronic apparatus, and displaying the stored voice recognition result after the voice recognition application is executed,
wherein the data corresponding to the user voice input is transmitted to the external server while the user voice input is received, and
wherein the external server is a server to provide the voice recognition result corresponding to the user voice input,
wherein the voice recognition application is an application executed by the electronic apparatus to store the voice recognition result and to provide the user interface including information related the voice recognition result provided by the external server, and
wherein the method further comprises identifying whether the data corresponding to the user voice input is being received when the voice recognition application is executed, and delaying the performing the function corresponding to the voice recognition result until the receiving of the data corresponding to the user voice input is completed.

10. The method as claimed in claim 9, further comprising:
sending a signal for activating a microphone to an external apparatus via middleware configured to relay the voice recognition application stored in a software,
wherein the performing the function corresponding to voice recognition comprises:
based on receiving the voice input initiation signal, generating an event to perform the voice recognition via the middleware.

11. The method as claimed in claim 9, further comprising:
receiving the data corresponding to the user voice input from an external apparatus, and
sending the received data to the external server via the established session before the voice recognition is performed.

12. The method as claimed in claim 10, further comprising:

receiving the data corresponding to the user voice input, and storing the received data in a buffer between a time when a signal for activating the microphone is sent and a time when driving of the voice recognition is completed, based on the data being received from the external apparatus; and sending the data stored in the buffer to the external server.

13. The method as claimed in claim 12, wherein the establishing the session with the external server comprises:

establishing the session with the external server based on receiving the data.

14. The method as claimed in claim 9, further comprising:

displaying information relating to a voice recognition progress based on receiving the voice input initiation signal.

15. The method as claimed in claim 10, wherein the receiving the voice input initiation signal from the external apparatus comprises:

receiving the voice input initiation signal in a first communication method, wherein the sending the received data to the external server comprises:

sending the received data in a second communication method different from a first communication method.

16. The method as claimed in claim 10, wherein in the receiving the voice input initiation signal from the external apparatus, the voice input initiation signal is generated by a press of a button of the external apparatus, and wherein the method further comprises:

receiving, from the external apparatus, information relating to a time for which the button is pressed; and blocking the established session based on the received information relating to the time for which the button is pressed, based on the time for which the button is pressed being greater than a predetermined time.

* * * * *